(12) United States Patent
Mermel et al.

(10) Patent No.: US 7,016,343 B1
(45) Date of Patent: Mar. 21, 2006

(54) PSTN CALL ROUTING CONTROL FEATURES APPLIED TO A VOIP

(75) Inventors: Adam Mermel, Santa Barbara, CA (US); David McDonell, Harvard, MA (US)

(73) Assignee: Cisco Technology, Inc., San Jose, CA (US)

( * ) Notice: Subject to any disclaimer, the term of this patent is extended or adjusted under 35 U.S.C. 154(b) by 971 days.

(21) Appl. No.: 10/035,608

(22) Filed: Dec. 28, 2001

(51) Int. Cl.
*H04L 12/66* (2006.01)
(52) U.S. Cl. ...................................... 370/356; 370/401
(58) Field of Classification Search ................ 370/356, 370/352, 353, 401
See application file for complete search history.

(56) References Cited

U.S. PATENT DOCUMENTS

| | | | |
|---|---|---|---|
| 6,141,341 A | 10/2000 | Jones et al. | |
| 6,188,760 B1 | 2/2001 | Oran et al. | |
| 6,215,784 B1 | 4/2001 | Petras et al. | |
| 6,260,071 B1 | 7/2001 | Armistead et al. | |
| 6,275,574 B1 | 8/2001 | Oran | |
| 6,333,931 B1 | 12/2001 | LaPier et al. | |
| 6,603,849 B1 * | 8/2003 | Lin et al. | 379/221.01 |
| 6,678,357 B1 * | 1/2004 | Stumer et al. | 379/45 |
| 6,704,406 B1 * | 3/2004 | Pearce et al. | 379/221.01 |
| 6,831,966 B1 * | 12/2004 | Tegan et al. | 379/88.16 |
| 2002/0141386 A1 * | 10/2002 | Minert et al. | 370/352 |
| 2003/0002476 A1 * | 1/2003 | Chung et al. | 370/352 |
| 2003/0091024 A1 * | 5/2003 | Stumer | 370/352 |
| 2004/0228336 A1 * | 11/2004 | Kung et al. | 370/352 |
| 2005/0078657 A1 * | 4/2005 | Huey | 370/352 |

OTHER PUBLICATIONS

Intelligent CallRouter Managing the Interaction Between Customer and Answering Resources, GeoTel Communications Corporation, (c) 1997, pp. 1-12.
Enhanced Gatekeeper Solutions Using GKTMP/API, Cisco Systems, Inc., (c) 2000, pp. 1-12.

* cited by examiner

*Primary Examiner*—Min Jung
(74) *Attorney, Agent, or Firm*—Cesari and McKenna, LLP (57) ABSTRACT

A system and method of sending and receiving voice calls over the Internet is described. The system includes a PSTN-derived intelligent call routing engine that receives call control messages from the Voice over IP (VoIP) network and routes calls via previously stored, customized routing procedures. Special dialing plan, 800 numbers, minimized cost routing, time and day-based least cost routing, transferring, conferencing, and additional messaging capabilities are provided. The system operates on standard server computers with interface cards connected to the packetized networks via TCP/IP and, indirectly, to VoIP gateways to accessing PSTN networks and to virtual and/or private networks (PBXs).

11 Claims, 6 Drawing Sheets

| MSG | MEANING | H.225 RAS | | GKTMP-NAM | |
|---|---|---|---|---|---|
| | | GK Tx? | GK Rcv? | NAM Tx? | NAM Rcv? |
| ACF | ADMISSIONS CONFIRM | ✓ | | ✓ | |
| ARJ | ADMISSIONS REJECT | ✓ | | ✓ | |
| ARQ | ADMISSIONS REQUEST | | ✓ | | ✓ |
| BCF | BANDWIDTH CONFIRM | ✓ | ✓ | ✓ | |
| BRJ | BANDWIDTH REJECT | ✓ | ✓ | ✓ | |
| BRQ | BANDWIDTH REQUEST | ✓ | ✓ | | ✓ |
| DCF | DISENGAGE CONFIRM | ✓ | ✓ | | |
| DRJ | DISENGAGE REJECT | ✓ | ✓ | | |
| DRQ | DISENGAGE REQUEST | ✓ | ✓ | | ✓ |
| GCF | GATEKEEPER CONFIRM | ✓ | | | |
| GRJ | GATEKEEPER REJECT | ✓ | | | |
| GRQ | GATEKEEPER REQUEST[16] | | ✓ | | |
| IACK | INFO REQUEST ACK | ✓ | | | |
| INAK | INFO REQUEST NEG ACK | ✓ | | | |
| IRQ | INFO REQUEST | ✓ | | | |
| IRR | INFO REQUEST RESPONSE | | ✓ | | |
| LCF | LOCATION CONFIRM | ✓ | ✓ | ✓ | ✓ |
| LRJ | LOCATION REJECT | ✓ | ✓ | ✓ | ✓ |
| LRQ | LOCATION REQUEST | ✓ | ✓ | | ✓ |
| NSM[18] | NON-STANDARD MESSAGE | ✓ | ✓ | | |
| RAC | RESOURCE AVAIL CONFIRMATION | ✓ | | | |
| RAI | RESOURCE AVAIL INDICATION | | ✓ | | ✓ |
| RCF | REGISTRATION CONFIRM | ✓ | | ✓ | |
| RIP | REQUEST IN PROGRESS | ✓ | ✓ | ✓ | |
| RRJ | REGISTRATION REJECT | ✓ | | ✓ | |
| RRQ | REGISTRATION REQUEST | | ✓ | | ✓ |
| UCF | UNREGISTRATION CONFIRM | ✓ | ✓ | | |
| URJ | UNREGISTRATION REJECT | ✓ | ✓ | | |
| URQ | UNREGISTRATION REQUEST | ✓ | ✓ | | ✓ |
| XRS[20] | UNKNOWN MSG RESPONSE | ✓ | ✓ | | |
| -- | TRIGGER REGISTER[21] REQUEST | | | ✓ | |
| | TRIGGER REGISTER RESPONSE | | | | ✓ |
| -- | TRIGGER UNREGISTER | | | ✓ | |
| | TRIGGER UNREGISTER RESPONSE | | | | ✓ |

PSTN CALL ROUTING CONTROL FEATURES APPLIED TO A VOIP

BACKGROUND OF THE INVENTION

1. Field of the Invention

This invention relates generally to voice calls being digitized and carried over digital communications networks, and more particularly to the adaptation of a public switched telephone network (PSTN) intelligent call routing engine as a call routing engine for voice-over-IP (VoIP) environment calls.

2. Background Information

Many systems are known and deployed for managing voice calls through the public switched telephone network or through private branch exchanges (PBXs) or other such private communications networks. These known systems include automatic call distribution systems (ACD's) that provide real-time premise switching and directing or other such call management and reporting capabilities. For example, the status (busy, or not) of human agents charged with answering an incoming call can be maintained by such a system, with new incoming calls directed to an available agent. Such agent state information, when accumulated in real-time across geographically dispersed call center ACD'S, forms a primary routing criterion for current intelligent call routing engines. Parameters of the incoming call, for example the calling line ID and/or network prompted caller entered digits, may likewise be used by the routing engine as decision factors in determining optimal agent and/or peripheral device (e.g. voice response unit, etc.) routing. The time, duration, statistics, and disposition of the call may be recorded as data for future use. Priority and other such criteria can be generated and stored for more efficient handling of incoming calls. For example, routing of calls is routinely accomplished wherein calls can be successively transferred and/or be part of a conference call using tie lines back through the public switched telephone network. The capabilities of such intelligent call routing engines are now well-known in the art.

With its origins in the DOD ARPAnet of the late sixties, the Internet has matured into a matrix of interconnected computers around the world—spanning educational, commercial, government, and private institutions. Based on the well-known Transmission Control Protocol/Internet Protocol (TCP/IP) protocol suite, Internet features have developed over time to facilitate a wide range of local and wide area network protocols and accompanying applications, e.g. file transfer protocols (FTP), world wide web (HTTP, HTML), news readers (USENET, NNTP), and email (SMTP). The ubiquitous layered protocol models (e.g., the five layer Internet Reference model and the seven layer International Organization for Standardization—OSI) are widely known, and systems have been implemented at virtually all "stack" layers to render information transfer using the IP protocol suite as simple, accessible, and direct—thus facilitating the Internet's phenomenal growth.

Despite the maturity of an entire suite of Internet protocols (or, in part, because of it) researchers continue to seek out additional useful applications of the technology. One such relatively new application has been with the encoding of voice telephone communication to allow transmission over the Internet. The technology functions by breaking analog voice signals into digitized "packets," which in turn are transmitted using Internet protocols (e.g. UDP—User Datagram Protocol). Relative to the maturity of the PSTN telephone infrastructure, technology for the manipulation of voice call establishment and the transmission of voice messages over IP is relatively new and immature. VoIP does, however, hold a number of advantages for carrying voice over the legacy (the existing known) PSTN network, both economic and technological.

Figure 1:
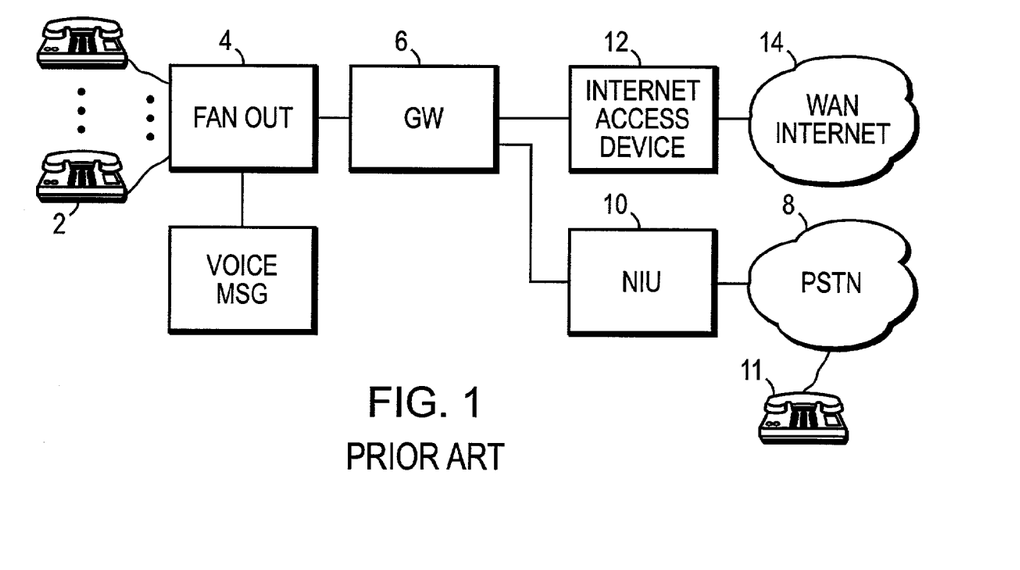
FIG. 1 is a system block diagram of the prior art call routing.

U.S. Pat. No. 6,141,341, by Jones et al. and assigned to Motorola describes a VoIP system. This patent discloses the dual use of a telephone. The telephone is connected to public switched telephone network (PSTN) and can send and receive regular voice messages via the PSTN. A signal or other mechanism is disclosed that allows the system to conduct an IP based call (VoIP). When a VoIP call is detected the system operates over the Internet to complete the voice message call. The components of a VoIP system, as in this patent, are shown in FIG. 1. Here telephones 2 are connected via some type of fan out box 4, known in the art, to a gateway (GW) 6. The GW connects to the public switched telephone network 8 via a network interface unit (NIU) 10. The GW also connects to an Internet Access device 12 (e.g. a cable modem) that in turn connects to the Internet or other such wide area network 14. There may be some form of voice messaging system as known in the art connected to the telephone network 2, but the full performance of mature call routing systems and the flexibility of the Internet are both largely unfulfilled.

The International Telecommunications Union standard gatekeeper logic embodied in its H.225 standard, referenced below, defines, perhaps, the most relevant prior art to while still falling short of the performance provided by the present invention.

The evolution of VoIP technology continues, and to date the commercial success of VoIP based systems has been moderate but measured. One key reason for the lack of more profound success with VoIP thus far is the requirement for transitional technologies to bridge the gap between PSTN and VoIP, allowing—for example—commercial service provider customers to exploit their significant investment in older switching technology and legacy telephone systems while migrating to a packet-based backbone digital medium. Often, this hybrid, transitional mode dictates a need for dual or composite systems, where the advantages of each are not fully realized, and the combination suffers from cumbersome artificial compromises.

A second (but equally profound) reason that VoIP deployment has not accelerated more swiftly is that the technology specific to feature-rich call routing and control in a VoIP environment is in its infancy relative to the longstanding analogous PSTN capabilities.

The present invention is directed to marrying the flexible and mature intelligent voice call management features of PSTN call routing systems with the analogous (albeit not yet mature) call address resolution mechanism of the newly evolving technology to facilitate voice calls over a digital communications network (VoIP). The invention offers a number of distinct advantages over current VoIP call addressing mechanisms, including the ability to exploit the fully mature, proven, and enriched features of the PSTN routing engine to provide features not yet available in known VoIP systems. A secondary appeal of the invention is its inherent advantage (to both commercial PSTN service providers as well as enterprise/internet users) migrating their voice communication to VoIP technologies from existing PSTN facilities deploying such a PSTN call routing engine. In such an environment the call routing engine may perform both PSTN and VoIP duties concurrently, easing the transitional burden of redundant configuration and switchover.

The invention presented herein provides an approach to exploit existing, technologically superior PSTN SCP level toll-free intelligent routing capabilities in an application that benefits, immediately, VoIP.

SUMMARY OF THE INVENTION

In view of the foregoing background discussion, the present invention provides the expanded call management services of mature PSTN voice call routing engine systems with systems that direct packetized voice message call addressing and control over the Internet (or other such digital communications networks).

Call control services and operations include, for example in a preferred embodiment, inter alia, number translations (800 service) in virtual private networks; time, congestion or least cost based routing; carrier (and remote zone) sensitive routing; caller source identification manipulation; interfaces using subscriber profiles or persistent database information; call queuing, unified messaging, allocations, and static or dynamic triggers used to pass appropriate parameters and/or information. The marriage of the existing PSTN-derived call routing engine with VoIP capabilities provides advantages where the routing engine provides an added layer of intelligence (beyond that currently available in VoIP deployments) for applying routing designations based on real time call considerations.

The invention is exemplifed using a digital call routing engine positioned as a back end server to facilitate packetized voice call routing over a digital communications network. The call routing engine interfaces usually via a network interface controller (NIC) with gatekeepers (GK's) that, in turn, interface with gateways providing an interface from the VoIP backbone to the ingress and egress PSTN networks. The digital call routing engine and NIC's communicate with the GK's using a message protocol, as known in the art. In practice the digital call routing engine and its NIC(s) may be referred to as a network applications manager (NAM). The message protocol used to transport VoIP call routing information between GW and GK/NAM is H.225 RAS ("Registration," "Admission" and "Status"). The NAM provides remote GK address or other endpoint destination translations for incoming admission and location control messages. The approach, in a preferred embodiment, is to map the incoming request source to the NAM concept of calling line identification (CLID) and incoming destination information to the NAM's concept of dialed number. The above "concept" includes use of user generated scripts and pre-defined call types, as known in the art, for resolving these parameters where, for example, different destination numbers may depend on time of day, least cost routing, etc. In a preferred embodiment, date and time of day and scripted general provisions such as percent allocation and variable evaluation give control of the call to a scripted "label node." The digital call routing engine evaluates the script and returns the mapped contents to the NIC.

References below to H.225, H.323, H.245 are to standard specifications published by the International Telecommunications Union (formerly known as CCITT) and are available at the following URL—http://www.itu.int/publications. The publications cited above are well known in the art and are incorporated herein by reference.

Upon presentation of a H.225 RAS call route request (H.225 Admission Request, ARQ), the NAM may return several forms of response based on the criteria mentioned above. The response may include a translated destination alias number, one more or more GW endpoint(s), one or more H.323 remote zone GK address(es), or meaningful combinations of each. In each case, the NIC receives from the digital call routing engine a generated "label," in some cases based on label context and call context from a second routing engine lookup is initiated by the NIC.

If the label is evaluated as a translated inter-zone dialed number, of digits including the country code, national destination code and the subscriber number, the NIC interprets the result as a destination alias and re-presents to the router the translated dialed number (appearing as a new, disjoint call route request) and CLID for secondary call type determination. The call router returns, in turn, one or more endpoint or remote GK transport address strings which, together with the initially obtained destination number, are returned to the requesting GK. The dialed number from the first translation is modified with a prefix character, in a preferred embodiment, to distinguish the first destination alias and the resolved destination in mapping the transport address.

If the label is evaluated as above but with a configured prefix indicating alias-only translation, the NIC will bypass the additional call router query and return the resulting label alone as the destination alias.

If the label is evaluated to denote the transport address or addresses of one or more remote GK's, the list of endpoint (EP) destinations is returned to the requesting GK without a secondary router interrogation.

If the label is evaluated to denote one or more endpoint transport addresses, the list of endpoint (EP) destinations is returned to the requesting GK without a secondary router interrogation, denoting one or a set of EP's.

VoIP call routing with the ICM consists primarily of RAS location and admission request (LRQ, ARQ) processing for both destination alias and endpoint resolution. As indicated above, remote zone as well as local endpoint resolution is provided, including alternate endpoint and remote zone list substitution and carrier sensitive routing designations. Additional enhancements to provide for gateway registration and availability tracking and additional features (e.g. per-port quota-based routing) may be found in other preferred embodiments.

In a combined PSTN/VoIP environment, voice calls originating in the PSTN enter the IP network via Gateways (see "ingress" and "egress" GW discussion above). Gateways receive analog voice calls and perform, as known in the art, the conversion to packetized voice for presentation to the TCP/IP network—in combination with corresponding data and call control manipulation.

Other objects, features and advantages will be apparent from the following detailed description of preferred embodiments thereof taken in conjunction with the accompanying drawings in which:

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
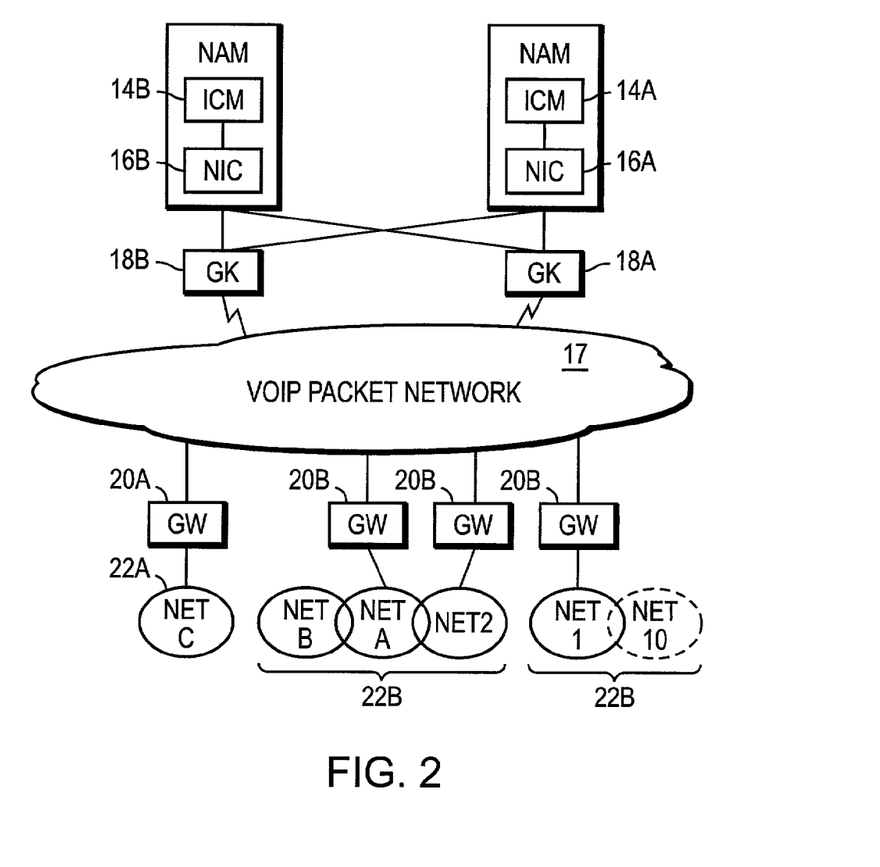
FIG. 2 is a system block diagram of an embodiment of the present invention.

FIG. 2 shows an integrated VoIP embodiment of the present invention. Here two digital call router engines are each labeled Intelligent Contact Manager (ICM) 14A and 14B. The ICM's are physically and logically connected to network interface controllers (NICs) 16A and 16B that are, in turn, configured—in a duplexed, fault tolerant configuration—to interface with VoIP gatekeepers (GK's) 18A and 18B. Each GK operates in accordance with the ITU H.323 standard—see below, and connects—via public or private IP network 17—to several gateways 20A and 20B (GW's) that in turn connect to particular ingress and egress telephone (PSTN) networks 22A and 22B. In another embodiment a Proxy Server, as defined by Session Initiation Protocol (SIP), an IEEE VoIP protocol and architecture, known in the art, may replace the GK. Both the SIP Proxy Server and H.323 Gatekeeper function as call control nodes performing analogous functions.

The interaction and information exchange between the GK and the GWs is based on the H.225 RAS protocol, although other protocols may be used that provide similar functions. The FIG. 3 table contains a list of RAS messages exchanged between the GWs, the GKs, and the NAM. The NAM, as described above, is a Network Applications Manager and functionally combines an ICM and NIC (see FIG. 2) for a particular or specialized service provider. The column in FIG. 3 headed by GKTMP-NAM is a subset of the H.225 RAS messages implemented in one preferred embodiment, as conveyed between the GK and NAM. In the preferred embodiment this exchange is known as GKTMP, the GK Transaction Message Protocol. When interfacing with a SIP Proxy Server in another preferred embodiment, the NIC component of the NAM conveys a comparable set of RAS messages via the identical GKTMP interface, with the SIP Proxy Server providing the translation between SIP message formats and (RAS-based) GKTMP messages.

Figure 3:
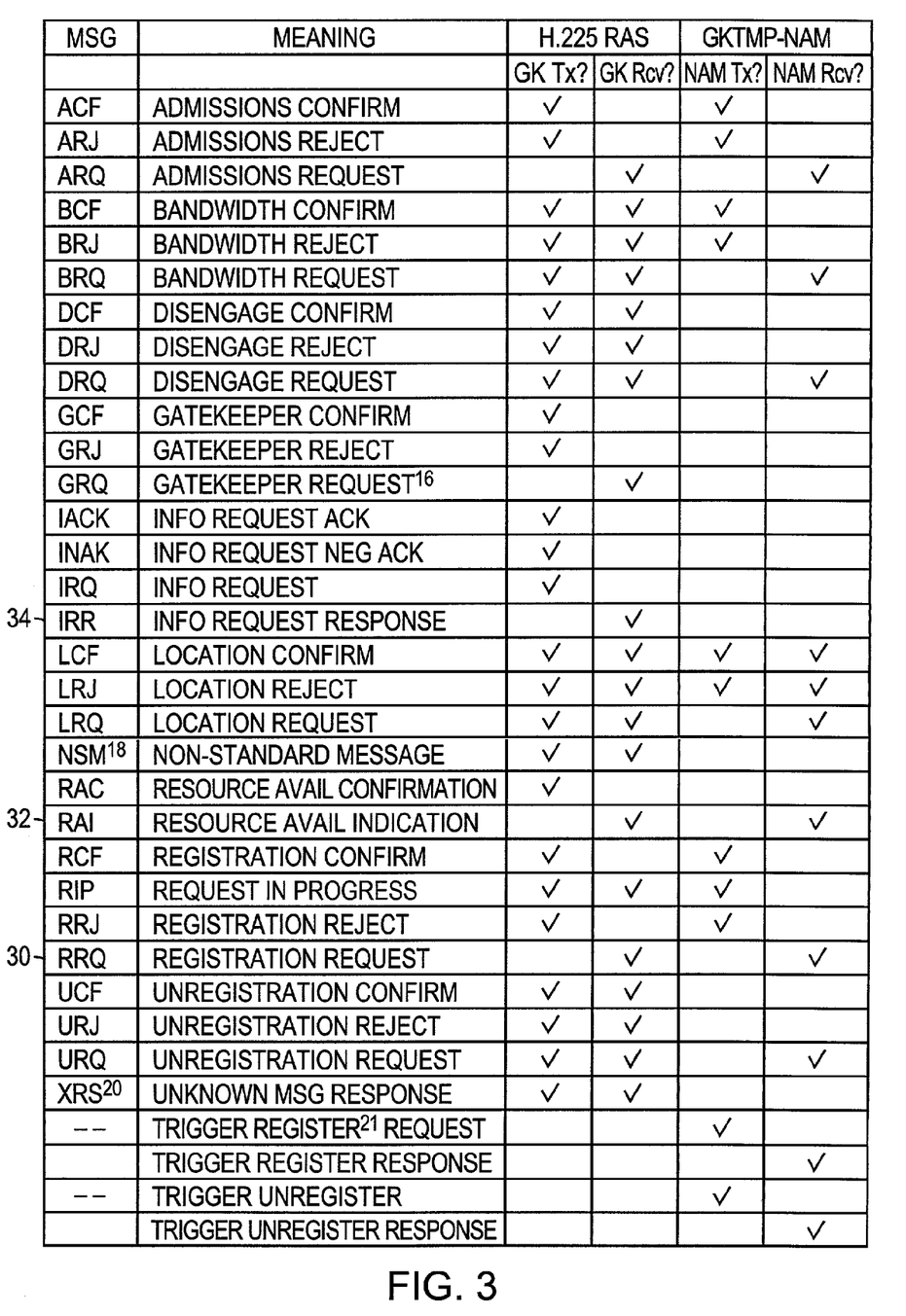
FIG. 3 is a table of RAS and GKTMP/NAM message types.

Using either the SIP Proxy Server or GK, information is provided to the NIC component allowing it to intercept VoIP call admission and GK location requests and resolve and return routing information (from the NAM router) for those requests. These admission and location request responses are derived within the NAM using legacy PSTN routing constructs as defined in the ICM implementation, using the ICM's native PSTN call control scripting capability.

While a number of call routing parameters may be resolved by the NAM, the primary parameters populated in the present invention are the H.323 endpoint and the corresponding destination alias. The former is defined herein as a device (as an IP addressable entity) from which or to which a packet switch voice call originates or terminates. In the present invention endpoints may refer to GW's, H.323 terminals, and/or SIP user agent devices. The latter (destination alias) refers to an alias translated and provided, ultimately, to the egress Gateway, terminal, or user agent. The destination alias is typically presented as the dialed digits that include the country code, national destination code and the subscriber number (ITU E.164 format). The destination alias may be labeled as an E.164 dialed number and, in the PSTN hybrid application, might provide to the egressing gateway the dialed number to which the call should be placed in the respective egressing PSTN network. E164 is a well-known ITU-T definition of a telecommunications number plan.

The NAM performs, inter alia, routing and number translation together with support for selection of endpoints and destinations. The GKTMP client supplies the NAM with the source and destination alias fields populated for a given call admission (or location) request; taken together the NAM resolves either a destination endpoint, destination alias, or both. In other embodiments the GKs may also supply information as to gateway registration and availability so that the NAM will be able to dynamically adjust destinations accordingly.

The ICM implements least cost routing (LCR) logic based, in part, on a user customized script for selecting endpoints or destinations based, in turn, on time of day, day of the week, database lookups, "if" conditional re-direction capabilities, percent allocation, and additional call context testing and manipulation. In a preferred embodiment, with respect to the above referenced standards, GKTMP requests of location and admission (Req-LRQ, Req-ARQ) are answered by the arguments within the corresponding response messages, e.g. GKTMP DestCallSignalAddress, interfaceSpecificBillingID, redirectReason, cicCode, and srcCallSignalAddress.

Those users/practitioners in the art may build scripts that direct calls to the appropriate endpoints based on one or more of the aforementioned criteria. Multiple endpoints can be combined and returned with associated priorities. These priorities may be specified by list ordering or by a priority tag associated with each given endpoint. In this manner cost-based routing and other such allocation routings with respect to congestion, type of service, etc. can be implemented. The NAM scripting capability thus provides the optimal real-time determination of endpoint and destination based on the user's finely tuned business rules, resolved in the context of call router state. Endpoints (and destinations) can be selected to optimize cost carrier sensitive routes, dialing plans, and the like.

Referring to FIG. 2, as mentioned above the ICM is itself duplexed with dual call routing engines and NIC's, such that each NIC "side" presents an identical and balanced interface by which to receive and process GKTMP traffic. A canonical form of the route request is formatted by a given NIC and presented to its respective NAM call router side. The request is subsequently duplicated and presented for redundant, fault tolerant processing by each NAM side. This arrangement ensures that any single point of failure in the NAM core logic will not prevent a given outstanding VoIP RAS message from being processed. The duplexed NIC arrangement likewise makes available equal network access to a common GKTMP client (provided the client supports multiple GKTMP sessions), ensuring continued availability should a single GKTMP session failure occur.

Figure 4:
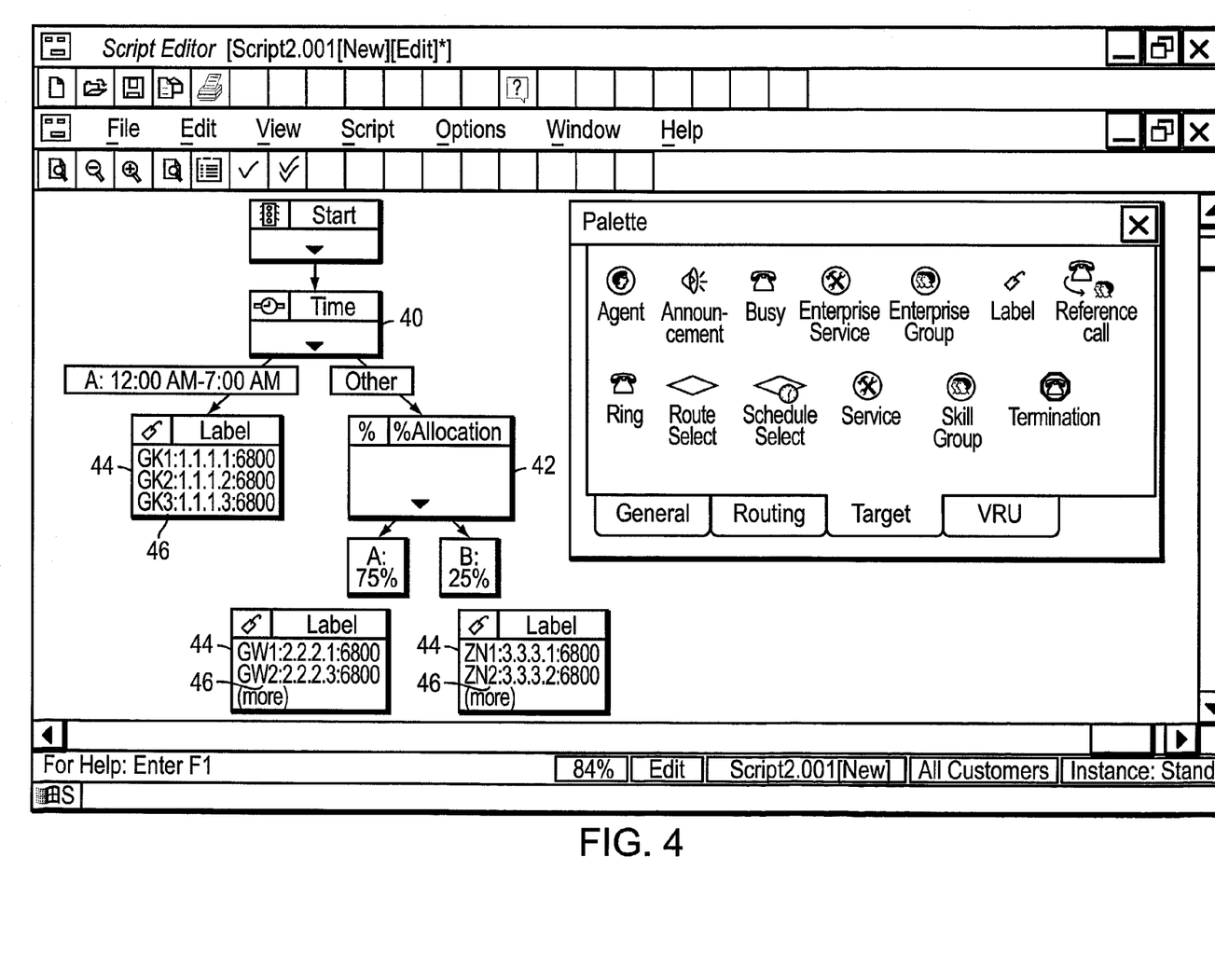
FIG. 4 is a screen shot illustrating scripting.

FIG. 4 is an illustration of a simple ICM endpoint routing script where the business user handles calls as directed by business rules. This example shows the second of a two-step routing process (the first being the destination alias resolution, performed by a disjoint script; transfer to this script is accomplished via cascaded script control via the "goto" function). The selection of the endpoints (transfer to the sample script) might have been dependent upon other information associated with the call, such as destination, source, re-direct information, and external information such as time, day and percent allocation. The appropriate endpoint, as shown, is determined based first on time 40 of day and, in one subsequent case, by percentage allocation 42 of total calls thus routed. In all cases in the example, multiple endpoints 44 are generated (via each respective "label" node), each returned in a predetermined prioritized order. The priority may be the sequence order 46 (as shown) or by a tag. In alternate embodiments the dynamically determined availability of the supplied endpoints is factored into routing decision (with unavailable or unregistered endpoints ignored, with appropriate warning messages). If none are available a GKTMP reject response can be returned or an alternative endpoint may be found. If a full, chosen set of GW's are not available, the script might allow the processing to go forward until an available GW is selected.

NAM's also have the capability to configure the GK's or other such interfacing devices connected to and exchanging information with the NAM. This configuration (of both triggers and filters) is established at GKTMP server registration time. Triggers may be contained in substrings of the dialed number, and additional parsing information may be used. Triggers refer to information that causes ("triggers") a specific response, and filters prevent certain operations from occurring.

Referring back to FIG. 2, the routing response of the NAM may indicate that a call will be terminated to an endpoint under NAM control, or, conversely, may consist of a message to the querying GK that it must in turn query another GK to resolve the endpoint (the "remote zone"). In a preferred embodiment the endpoints (and remote zone) are addressed using a standard IP V4 address in the form of A.B.C.D:xxxx, where ABCD is the IP address and the "xxxx" is the port number. The routing response from the NAM is based on the type of target, with the user determining the message type within the label node.

In this preferred embodiment, the NAM-GK interface is a standard TCP/IP connection, where the NAM listens (on a configurable address and port) for incoming connection requests from one or more GK's. The NAM is the logical back end server (as known in that art) responding to the GK requests for registration, admission control, location requests, and resource availability information.

In other preferred embodiments, registration of GW's (RAS RRQ 30 from FIG. 3) is necessary to determine availability (RAI 32, IRR 34). The NAM tracks GW availability based on registration number and resource availability indicator messages. The NAM maintains a list of registered GW's and the corresponding availability information of each; if the NAM and the GK lose communications all the GW's will be marked as unavailable. Through tracking GW availability in combination with configured capacity and dynamic call placement, the NAM becomes empowered to load balance calls across gateways in a configurable, optimized port allocation manner.

In another preferred embodiment each call residing on an endpoint is monitored thereby allowing the GW utilization to be measured on a per-call basis in real time. Such information is useful for record keeping and billing. The NAM GK interface and software provide the potential for call transferring, hold, re-route, merge, monitor busy and disconnect, hang-up, and other such status information.

Figure 5:
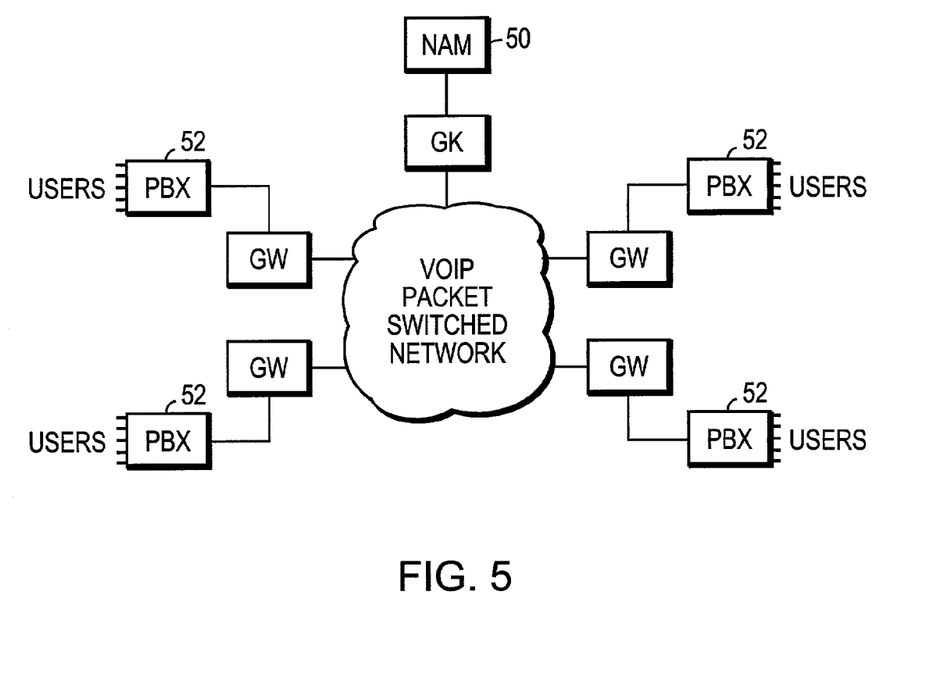
FIG. 5 is a block diagram of a system using dialing plans.

The NAM supports overlapping dial plans, where customers are able to define their own virtual private networks (VPN). In one embodiment shown in FIG. 5, the customer private branch network 52 (exchange) or PBX determines the actual called party. The NAM 50 determines the appropriate terminating customer switch (PBX). In another preferred embodiment the dialing plan is completely resident in the NAM where the NAM translates the virtual number to the endpoint addresses and/or alias number. The customers' PBXs are used to manage the dial plan (to/from) and the NAM determines routing. Script logic is used to determine the customer and the selection of the endpoint. In this embodiment, in order to enable the NAM to determine routing, all the callers must be "known" to the NAM. This could be arranged by a range of numbers or by unique identifiers.

An example of the script might be:

If srcInfo is between 2920000 and 2930000 then execute script Cust1

Else if srcInfo is between 2930000 and 2940000 then execute script Cust2

Or:

If srcInfo info is CustABoston or CustADenver then execute script Cust1

Else if srcInfo is CustBLosAngeles or CustBSeattle then execute scriptCust2

These scripts are routing objects that determine the endpoint based on the DestInfo field.

Where calling party information is random in the VPN case, each calling number is typically defined in a script—tested via the incoming srcInfo field. A customer database with the associations between the calling parties and their company is required.

In another embodiment, where customers are not identified in some fashion to the NAM, the identity of the specific customer is based on the dialed number (from the incoming destInfo field), and number translation may be required.

Where unique dial plans exist, a database application can be developed by the customer to determine the dial plan based on the calling party where a terminating address is returned, if needed.

For on-net to off-net calls information in a database identifies the call as VPN. Information from the database is found via an SQL gateway or an application gateway to retrieve information used by the database application to determine the new destination. Once the destination is determined the NAM determines the appropriate endpoint via the appropriate script.

Figure 6:
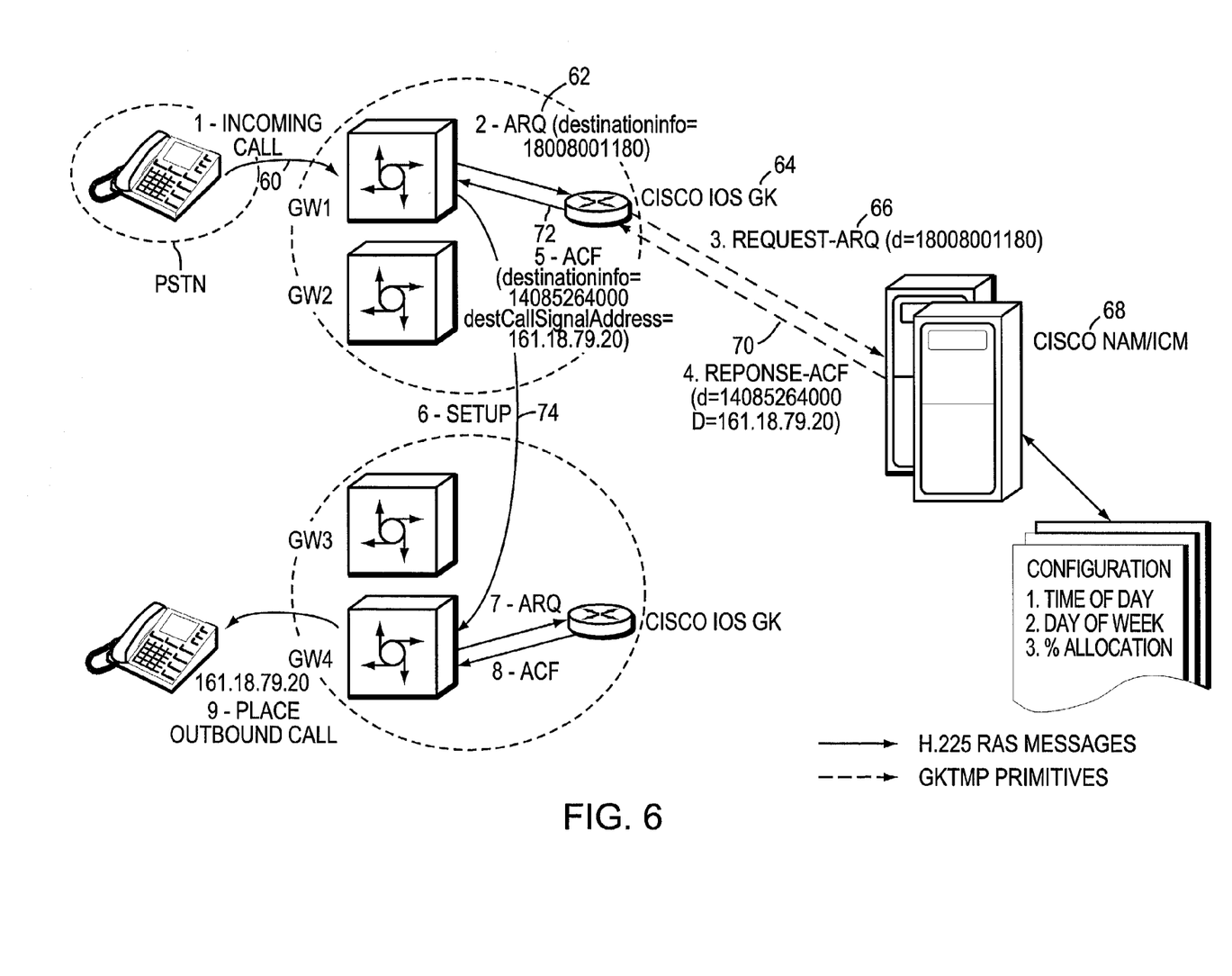
FIG. 6 is flow diagram example of a 800 number translation.

FIG. 6 is an example application illustrating a typical 800 number address resolution. The incoming call to an 800 number 60 is initiated from the PSTN to GW1. An ARQ (address request) 62, containing information about the call's dialed number destination, is sent to the GK 64. The GK 64 was configured to trigger the application in response to an ARQ message. The ARQ is conveyed via the GKTMP protocol and sent 66 to the NAM 68. The application is scripted to act on the GKTMP message to complete the call from the dialed number address and IP address of an endpoint. The NAM can be configured for various types of routing scenarios as described above. This derived information is added to a RESPONSE message 70 containing the destination alias and/or endpoint and sent back to the GK by the NAM. The GK communicates with the GW 72 after translating the GKTMP format into RAS format. The GW communicates 74, in response to the routing information initiated at the NAM server 68 via the GK, with GW4 by placing the outbound call to, in this case, IP address 161.18.79.20.

With respect to FIG. 6 and early block diagrams, the physical components comprising the PSTN voice network, e.g. telephones, PBX's and other local networks include hardware elements that are well known in the art. Similarly, the gateways, gatekeepers, NAM's comprise computing systems, servers, routers, bridges, and other such computing and communication hardware that is well known in the art. For example, see hardware and software from Cisco Systems Inc.

Figure 7:
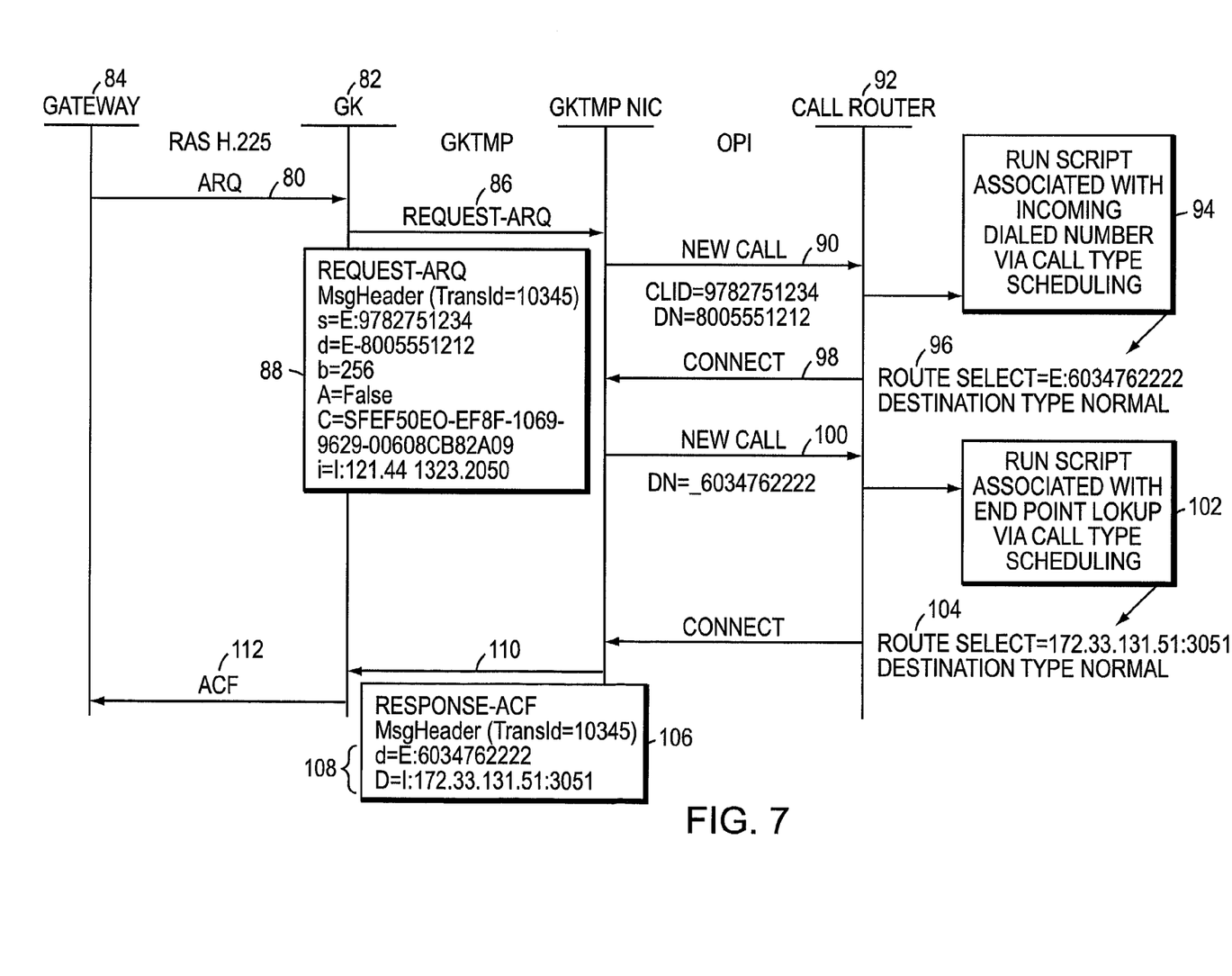
FIG. 7 is a diagram of a call flow example (NAM translation operations).

An example of Gatekeeper/NAM/Gateway Sequences is shown in FIG. 7 and is described as follows:

The example uses specification conventions indicated by <tag>=<field-type>:value All mandatory message fields are represented, but any optional message fields not shown are ignored if received by the NAM and not populated if sent by the NAM.

1. Single Resolved Destintation and EP:

The following is an embodiment of a statically defined (single) destination address and a single EP. The incoming srcInfo (ANI) and destinationInfo (DN) are mapped by the NAM to a resolved destinationInfo number and to an EP transport address. The resolved transport address is mapped in a secondary operation, based in part on the resolved destinationInfo. All numbers are in the E.164 format.

The NAM's generation of a RESPONSE-xCF bypasses default GK routing logic and resolves the route based on parameters as supplied in the response.

Received by NIC
REQUEST-ARQ
MsgHeader(TransId=10345)
s=E:9782751234
d=E:8005551212
b=256
A=False
C=5FEF50E0-EF8F-1069-9629-00608CB82A09
I=I:121.44.132.3:2050
Sent by NIC
RESPONSE-ACF
MsgHeader(TransId=110345)
d=E:6034762222
D=I:172.33.131.51:3051

Notes on the preceding example:

The "d" tag parameter (ARQ:destinationInfo alias) is mandatory and if not supplied the response will be a null-body RESPONSE-ARQ.

The incoming Bandwidth (tag "b"), ConferenceID (tag "C"), and the "arqing endpoint identifier" (tag "I", not shown) are ignored by the NAM.

Selected H.225 RAS location and admission request parameters are packaged by the NIC and presented to the call router for script access (and subsequent customer specific routing action); these include destCallSignalAddress ("D" tag, ARQ), interfaceSpecificBillingId, redirectNumber ("e" tag, ARQ and LRQ), redirectReason ("E" tag, ARQ and LRQ), interfaceDescriptor, and srcCallSignalAddress ("S" tag, ARQ).

If more than a single destinationInfo alias is supplied to the NAM, all but the first are ignored.

ARQ:answerCall (boolean) is set False for normal ingress route requests. If found to be True, the NAM assumes an egress "answer permission" request from the terminating GW and responds with a RESPONSE-ACF, echoing back the incoming request parameters without translating or further interpretation.

The operations of the above example are further described with respect to FIG. 7.

An H.225 RAS admission request 80 is presented to the H.323 Gatekeeper (GK) 82 from an egress Gateway 84.

The GK processes the request, generating the corresponding GKTMP Request-ARQ message 86. The primary Request-ARQ fields 88 are shown; a key to the fields and GKTMP field types is as follows. TransId is transaction ID, "s" is ARQ:srcInfo (Alias-Address field type, "E" designates E.164 number format), "d" is ARQ:destinationInfo (Alias-Address field type), "b" ARQ:bandWidth (Bandwidth field type), "A" is ARQ:answerCall (Boolean field type), "C" is ARQ:ConferenceID (GUID field type), "i" is the endpoint identifier (TransportAddress field type).

Receiving the GKTMP Request-ARQ, the GKTMP NIC (aka GK NIC) extracts and maps the ARQ:srcInfo E.164 number string as the PSTN Calling Line ID (CLID), and the ARQ:destinationInfo E.164 number string as the PSTN Dialed Number (DN). These are formatted in a "new call" request 90 and presented to the ICM Call Router.

Based on a Call Type formulated from the incoming CLID and DN, the Call Router 92 executes the routing script 94 for the Call Type and generates a resulting label (RouteSelect) 96, configured in the form of an E.164 number. This label is returned to the NIC in an internal "connect" 98 message; this is the resolved destinationAlias to be returned to the GK.

The NIC prefixes an underscore ("_") on the label to avoid mapping address space overlap (i.e. avoid conflict with incoming LRQ whose destinationInfo alias might overlap with that resolved in the preceding step), and presents, again, a "new call" 100 message to the Call Router 92. This second mapping generates an independent label result 104 (via a separate, usually disjoint script invocation 102), taking the form of an IP V4 address and port (shown as 172.33.131.51: 3051) 106.

The NIC, upon receiving the second mapping, interprets the resulting label as a GKTMP TransportAddress endpoint address. Together with the destinationAlias, the transport address is formatted (as "d" and "D" field 108 types, respectively) in the GKTMP Response-ACF (admission confirmation) and forwarded by the NIC back to the GK 110.

The GK returns the information as an H.225 RAS ACF 112 to the requesting Gateway.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A method for deploying a public switched telephone network intelligent call routing engine in the management of voice calls on a digital packetized communications network employing an Internet protocol comprising the steps of:
    packetizing voice call messages containing control messages and data, wherein call control messages include call control operations and parameters,
    intercepting call control messages,
    directing the call control messages to a communications network applications manager,
    mapping call control operations and parameters to public switched telephone network intelligent call routing engine call operations and parameters,
    resolving destination and endpoints from the mapped call control operations and parameters,
    executing a user defined script that further resolves destination and endpoints, and
    re-mapping public switched telephone network intelligent call routing engine operations and parameters to the resolved destination and endpoints.

2. The method as defined in claim 1 further comprising the steps of:
    determining least cost routing, percent allocation, time of day, day of the week, predefined priorities and conditional re-direct information.

3. The method as defined in claim 1 further comprising the step of routing the call with respect to the predefined business rules of the user.

4. The method as defined in claim 1 further comprising the steps of allocating a plurality of gateways to a gatekeeper.

5. The method as defined in claim 1 further comprising the step of determining the availability of the user's agents.

6. Apparatus for deploying a public switched telephone network intelligent call routing engine in the management of voice calls on a digital packetized communications network employing an Internet protocol comprising:

a digitizer for digitizing and packetizing voice call messages containing control messages and data, wherein call control messages include call control operations and parameters, means for intercepting call control messages, means for directing the call control messages to a communications network applications manager, means for mapping call control operations and parameters to public switched telephone network intelligent call routing engine call operations and parameters, means for resolving destination and endpoints from the mapped call control operations and parameters, means for executing a user defined script that further resolves destination and endpoints, and means for re-mapping public switched telephone network intelligent call routing engine operations and parameters to the resolved destination and endpoints.

7. The apparatus as defined in claim 6 further comprising means for determining least cost routing, percent allocation, time of day, day of the week, predefined priorities and conditional re-direct information.

8. The apparatus as defined in claim 6 further comprising means for routing the call with respect to the predefined business rules of the user.

9. The apparatus as defined in claim 6 further comprising means for allocating a plurality of gateways to a gatekeeper.

10. The apparatus as defined in claim 6 further comprising means for determining the availability of the user's agents.

11. A computer system including processors, electronic memories, and interface electronics, all of which may be programmable, where the interface electronics includes gateways, gatekeepers, network managers, and network interfaces to digital packetized communication networks and to public system telephone networks, the computer system constructed and arranged for deploying a public switched telephone network intelligent call routing engine in the management of voice calls on a digital packetized communications network employing an Internet protocol comprising:

a digitizer for digitizing and packetizing voice call messages containing control messages and data, wherein call control messages include call control operations and parameters, means for intercepting call control messages, a manager for directing the call control messages to a communications network applications manager, a first mapper for mapping call control operations and parameters to public switched telephone network intelligent call routing engine call operations and parameters, means for resolving destination and endpoints from the mapped call control operations and parameters, a user defined script that when executed further resolves destination and end-points, and a second mapper for re-mapping public switched telephone network intelligent call routing engine operations and parameters to the resolved destination and endpoints.

* * * * *